United States Patent
Lin et al.

(10) Patent No.: US 11,137,934 B2
(45) Date of Patent: Oct. 5, 2021

(54) MEMORY BLOCK TYPE PROCESSING METHOD APPLICABLE TO ELECTRONIC DEVICE ELECTRONIC DEVICE AND NON-TRANSITORY COMPUTER READABLE STORAGE MEDIUM

(71) Applicant: ONEPLUS TECHNOLOGY (SHENZHEN) CO., LTD., Shenzhen (CN)

(72) Inventors: Kengyu Lin, Shenzhen (CN); Wenyen Chang, Shenzhen (CN)

(73) Assignee: ONEPLUS TECHNOLOGY (SHENZHEN) CO., LTD., Shenzhen (CN)

( * ) Notice: Subject to any disclaimer, the term of this patent is extended or adjusted under 35 U.S.C. 154(b) by 28 days.

(21) Appl. No.: 16/622,982

(22) PCT Filed: Jun. 11, 2018

(86) PCT No.: PCT/CN2018/090684
§ 371 (c)(1),
(2) Date: Dec. 16, 2019

(87) PCT Pub. No.: WO2018/228340
PCT Pub. Date: Dec. 20, 2018

(65) Prior Publication Data
US 2021/0149582 A1    May 20, 2021

(30) Foreign Application Priority Data
Jun. 16, 2017   (CN) .......................... 201710457639.6

(51) Int. Cl.
*G06F 13/00* (2006.01)
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0604; G06F 3/0679
See application file for complete search history.

(56) References Cited

U.S. PATENT DOCUMENTS

| 6,513,095 | B1 | 1/2003 | Tomori |
| 2011/0271074 | A1 | 11/2011 | Lyu |

(Continued)

FOREIGN PATENT DOCUMENTS

| CN | 1527206 A | 9/2004 |
| CN | 101075214 A | 11/2007 |

(Continued)

OTHER PUBLICATIONS

International Search Report in the international application No. PCT/CN2018/090684, dated Sep. 10, 2018.

(Continued)

*Primary Examiner* — Jing-Yih Shyu
(74) *Attorney, Agent, or Firm* — Syncoda LLC; Feng Ma (57) ABSTRACT

A memory block type processing method includes: a state of each memory block in the electronic device is monitored; when it is monitored that a memory block is released, a type of the released memory block is detected; responsive to that it is detected that an original type of the released memory block is inconsistent with a present type of the released memory block, a released memory capacity of the released memory block is detected; and the present type of the released memory block is adjusted according to the detected released memory capacity. Therefore, sufficient regional ranges of memory partitions of the reclaimable and/or movable types can be ensured, and during memory compaction, a continuous memory that is sufficient for a user to (Continued)

use can be effectively provided by compaction to alleviate the memory fragmentation problem.

18 Claims, 6 Drawing Sheets

(56) References Cited

U.S. PATENT DOCUMENTS

| | | | |
|---|---|---|---|
| 2013/0205114 A1 | 8/2013 | Badam et al. | |
| 2016/0055082 A1* | 2/2016 | Kim | G06F 12/0875 711/118 |
| 2016/0299841 A1 | 10/2016 | Basu et al. | |
| 2017/0177274 A1* | 6/2017 | Mylly | G06F 3/0673 |

FOREIGN PATENT DOCUMENTS

| | | |
|---|---|---|
| CN | 101908022 A | 12/2010 |
| CN | 103092769 A | 5/2013 |
| CN | 104021085 A | 9/2014 |
| CN | 104102590 A | 10/2014 |
| CN | 104536773 A | 4/2015 |
| CN | 105843748 A | 8/2016 |
| CN | 107247674 A | 10/2017 |
| EP | 1758027 A2 | 2/2007 |
| WO | 2005066970 A2 | 7/2005 |

OTHER PUBLICATIONS

English translation of the Written Opinion of the International Search Authority in the international application No. PCT/CN2018/090684, dated Sep. 10, 2018.
Supplementary European Search Report in the European application No. 18818664.7, dated Feb. 3, 2021.

* cited by examiner

MEMORY BLOCK TYPE PROCESSING METHOD APPLICABLE TO ELECTRONIC DEVICE ELECTRONIC DEVICE AND NON-TRANSITORY COMPUTER READABLE STORAGE MEDIUM

CROSS-REFERENCE TO RELATED APPLICATIONS

The present application is a national stage of International Application No. PCT/CN2018/090684 filed on Jun. 11, 2018, which claims priority to Chinese Patent Application No. 201710457639.6, filed on Jun. 16, 2017. The disclosures of these applications are hereby incorporated by reference in their entirety.

TECHNICAL FIELD

The disclosure relates to a computer storage technology, and more particularly, to a memory block type processing method and device, an electronic device and a readable storage medium.

BACKGROUND

In case of a memory fragmentation problem, certain time and resources are required for memory compaction to make available memories adjacent for integration into a whole continuous storage space, which may bring influence to normal operations by a user to a certain extent and thus cause energy consumption.

SUMMARY

Embodiments of the disclosure provide a memory block type processing method and device, an electronic device and a readable storage medium, which may effectively provide, by compaction, a continuous memory that is sufficient for a user to use, thereby solving the memory fragmentation problem.

The embodiments of the disclosure provide a memory block type processing method, which may be applied to an electronic device, a memory of the electronic device including multiple memory blocks of a movable type, multiple memory blocks of a reclaimable type and multiple memory blocks of an unmovable type, the method including the following operations.

A state of each memory block in the electronic device is monitored.

When it is monitored that a memory block is released, a type of the released memory block is detected.

Responsive to detecting that an original type of the released memory block is inconsistent with a present type of the released memory block, a released memory capacity of the released memory block is detected.

The present type of the released memory block is adjusted according to the detected released memory capacity.

The embodiments of the disclosure provide a memory block type processing device, which may be applied to an electronic device, a memory of the electronic device including multiple memory blocks of a movable type, multiple memory blocks of a reclaimable type and multiple memory blocks of an unmovable type, the device including a monitoring module, a type detection module, a capacity detection module and an adjustment module.

The monitoring module may be configured to monitor a state of each memory block in the electronic device.

The type detection module may be configured to, when it is monitored that a memory block is released, detect a type of the released memory block.

The capacity detection module may be configured to, responsive to detecting that an original type of the released memory block is inconsistent with a present type of the released memory block, detect a released memory capacity of the released memory block.

The adjustment module may be configured to adjust the present type of the released memory block according to the detected released memory capacity.

The embodiments of the disclosure provide an electronic device, which may include:

a memory;

a processor; and a memory block type processing device, the memory block type processing device being installed in the memory and including one or more software function modules executed by the processor and the device including a monitoring module, a type detection module, a capacity detection module and an adjustment module.

The monitoring module may be configured to monitor a state of each memory block in the electronic device.

The type detection module may be configured to, when it is monitored that a memory block is released, detect a type of the released memory block.

The capacity detection module may be configured to, responsive to detecting that an original type of the released memory block is inconsistent with a present type of the released memory block, detect a released memory capacity of the released memory block.

The adjustment module may be configured to adjust the present type of the released memory block according to the detected released memory capacity.

A fourth purpose of the disclosure is to provide a readable storage medium having stored thereon a computer program that, when executed, controls an electronic device where the readable storage medium is located to implement a memory block type processing method provided in the embodiments of the disclosure.

Compared with a related art, the embodiments of the disclosure have the following beneficial effects.

According to the embodiments of the disclosure, sufficient regional ranges of memory partitions of the reclaimable and/or movable types can be ensured, and during memory compaction, a continuous memory that is sufficient for a user to use can be effectively provided by compaction to alleviate the memory fragmentation problem.

BRIEF DESCRIPTION OF THE DRAWINGS

In order to describe the technical solutions of the embodiments of the disclosure more clearly, the drawings required to be used in the embodiments will be simply introduced below. It is to be understood that the following drawings only illustrate some embodiments of the disclosure and thus should not be considered as limits to the scope. Other related drawings may further be obtained by those of ordinary skill in the art according to these drawings without creative work.

REFERENCE SIGNS

100—electronic device; 110—memory; 120—processor; 130—network module; 200—memory block type processing device; 210—monitoring module; 220—type detection module; 230—capacity detection module; and 240—adjustment module.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. Components, described and shown in the drawings, of the embodiments of the disclosure may usually be arranged and designed with various configurations. Therefore, the following detailed descriptions about the embodiments of the disclosure in the drawings are not intended to limit the claimed scope of the disclosure but only represent selected embodiments of the disclosure. All other embodiments obtained by those of ordinary skill in the art based on the embodiments in the disclosure without creative work shall fall within the scope of protection of the disclosure.

In the related art, a memory is usually divided into three types of memory partitions: unmovable partitions, movable partitions and reclaimable partitions. One type of memory partitions can be used as another type of memory partitions; and when a specific condition is met, a partition of a certain type may be allowed to use a memory block of another partition and convert a type of the memory block. When a memory in the unmovable memory partition is not sufficient, it is queried whether the reclaimable and/or movable memory partition includes sufficient memory blocks, and if YES, the memory block is directly used and a type of the memory block is converted to be unmovable to alleviate the memory fragmentation problem.

The above solution has the problem that, if the unmovable partition borrows the memory block of the reclaimable and/or movable memory partition and converts the type of the memory block to be unmovable, the type of the memory block may still be the unmovable type even though the memory block is released and returned. This may result in excessive occupation of the reclaimable and/or movable memory partition to bring influence to working efficiency of a memory compaction mechanism and make a memory fragmentation alleviation effect poor during memory compaction.

Figure 1:
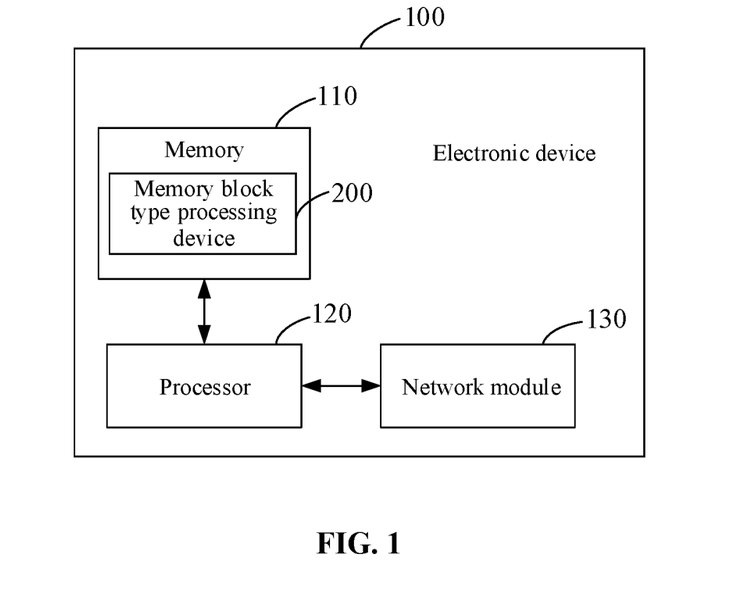
FIG. 1 is a structure diagram of an electronic device according to an embodiment of the disclosure.

For the memory fragmentation problem, an embodiment of the disclosure provides an electronic device 100. Referring to FIG. 1, FIG. 1 is a structure diagram of an electronic device 100 according to an embodiment of the disclosure. The electronic device 100 includes a memory 110, a processor 120, a network module 130 and a memory block type processing device 200.

The memory 110, the processor 120 and the network module 130 are electrically connected with one another directly or indirectly to implement data transmission or interaction. For example, these components may be electrically connected through one or more communication buses or signal lines. The memory block type processing device 200 is stored in the memory 110. The memory block type processing device 200 includes at least one software function module stored in the memory 110 in form of software or firmware. The processor 120 runs a software program and module stored in the memory 110, thereby executing various function applications and data processing.

The memory 110 may be, but not limited to, a Random Access Memory (RAM), a Read Only Memory (ROM), a Programmable Read-Only Memory (PROM), an Erasable Programmable Read-Only Memory (EPROM), an Electrically Erasable Programmable Read-Only Memory (EEPROM) and the like. The memory 110 is configured to store the program, and the processor 120, after receiving an execution instruction, executes the program. In some embodiments of the disclosure, the software program and module in the memory 110 may further include an operating system, which may include various software components and/or drives configured to manage system tasks (for example, memory management, storage device control and power management) and may communicate with various hardware or software components, thereby providing a running environment for the other software components.

The processor 120 may be an integrated circuit chip with a signal processing capability. The processor 120 may be a universal processor, including a Central Processing Unit (CPU), a Network Processor (NP) and the like, and may also be a Digital Signal Processor (DSP), an Application Specific Integrated Circuit (ASIC), a Field-Programmable Gate Array (FPGA) or another programmable logical device, discrete gate or transistor logical device and discrete hardware component. Each method, step and logical block diagram provided in the embodiments of the disclosure may be implemented or executed. The universal processor may be a microprocessor or the processor may also be any conventional processor and the like.

The network module 130 is configured to establish a communication connection between the electronic device 100 and an external device through a network to implement network signal and data transmission and reception operations.

It may be understood that the structure shown in FIG. 1 is only schematic and the electronic device 100 may further include components more or fewer than those shown in FIG. 1 or adopt a configuration different from that shown in FIG. 1. Each component shown in FIG. 1 may be implemented by use of hardware, software or a combination thereof.

An embodiment of the disclosure provides a readable storage medium, which includes a computer program. The computer program runs to control an electronic device 100 where the readable storage medium is located to execute the following memory block type processing method, for example, the memory block type processing method shown in any one of FIG. 2 to FIG. 5.

When a continuous memory in an unmovable memory partition is not sufficient, it is queried whether a reclaimable and/or movable memory partition includes sufficient memory blocks. If YES, the reclaimable and/or movable memory block may be borrowed, and a type of the borrowed memory block is converted to be unmovable. If NO, the memory fragmentation problem occurs, and memory compaction is performed on the electronic device 100 to provide a continuous memory space that is sufficient to meet a storage requirement of a user.

In the embodiments of the disclosure, memory fragmentation refers to that, when the user needs continuous memory blocks of a set capacity (recorded as N), a capacity of each memory block is less than N required by the user even though a total capacity of available memory is greater than N, thus making it impossible to meet the requirement of the user. Memory compaction refers to that, in an operating system, a virtual address and a practical memory are required to be mapped and converted, and there are usually two mappings: one is movable mapping, namely the virtual address and a practical memory address may be dynamically adjusted (for example, memories used by the user have the same virtual address but may be dynamically mapped to different practical memory addresses), and the other is unmovable mapping, namely the mapping between the virtual address and the practical memory address is not allowed to change.

In the embodiments of the disclosure, memory compaction is memory compaction movement work for movable memory blocks, and if a region of a memory partition of a movable type may be kept larger, it is indicated that a memory compaction degree is higher and the memory fragmentation problem may be effectively alleviated.

For solving the technical problem of memory fragmentation, an embodiment of the disclosure provides a memory block type processing method. By the method, sufficient regional ranges of memory partitions of reclaimable and/or movable types can be ensured, and during memory compaction, a continuous memory that is sufficient for a user to use can be more effectively provided by compaction, and occurrence of the memory fragmentation problem next time can be delayed.

Figure 2:
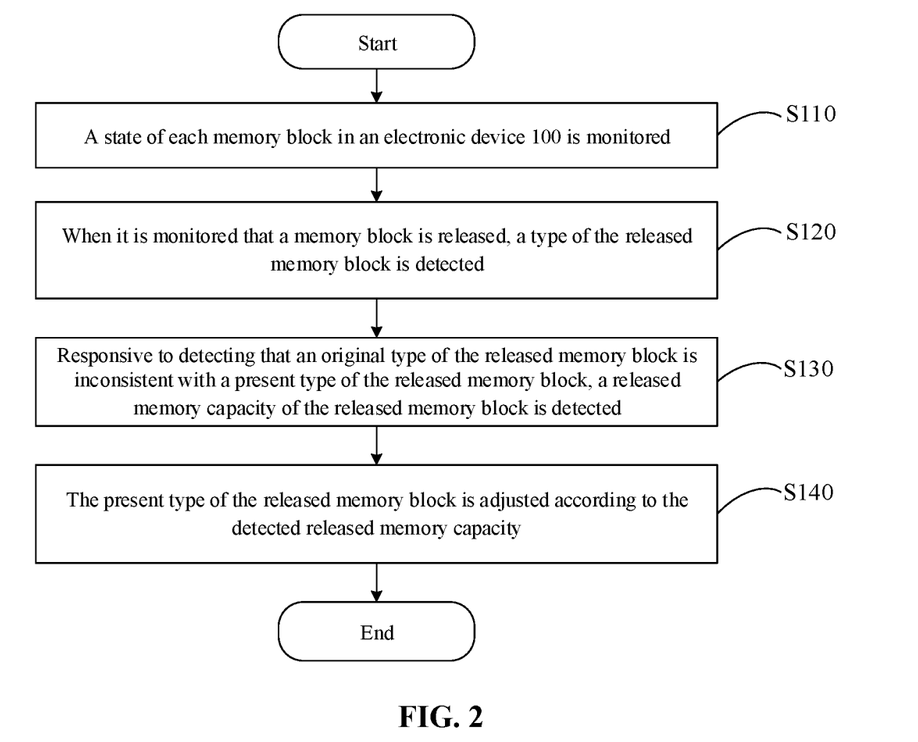
FIG. 2 is a first flowchart of steps of a memory block type processing method according to an embodiment of the disclosure.

Referring to FIG. 2, FIG. 2 is a first flowchart of steps of a memory block type processing method according to an embodiment of the disclosure. The memory block type processing method is applied to an electronic device 100. A memory of the electronic device 100 includes multiple memory blocks of a movable type, multiple memory blocks of a reclaimable type and multiple memory blocks of an unmovable type. A specific flow of the memory block type processing method will be described below in detail.

In S110, a state of each memory block in the electronic device 100 is monitored.

In the embodiment of the disclosure, the electronic device 100 may monitor the state of each memory block in the memory to perform related detection on a memory block when it is monitored that the memory block is occupied or released.

In S120, when it is monitored that a memory block is released, a type of the released memory block is detected.

In the embodiment of the disclosure, the type of the released memory block refers to a common partition type for the memory, and may include, but not limited to, unmovable, movable and reclaimable. A memory partition of the unmovable type refers to that the memory partition in the memory is at a fixed position and may not be moved to another place, and allocation of core kernels mostly belongs to this type. A reclaimable memory partition refers to that the memory partition may not be directly moved in the memory but may be reclaimed. A movable memory partition refers to that the memory partition may be moved freely in the memory.

Figure 3:
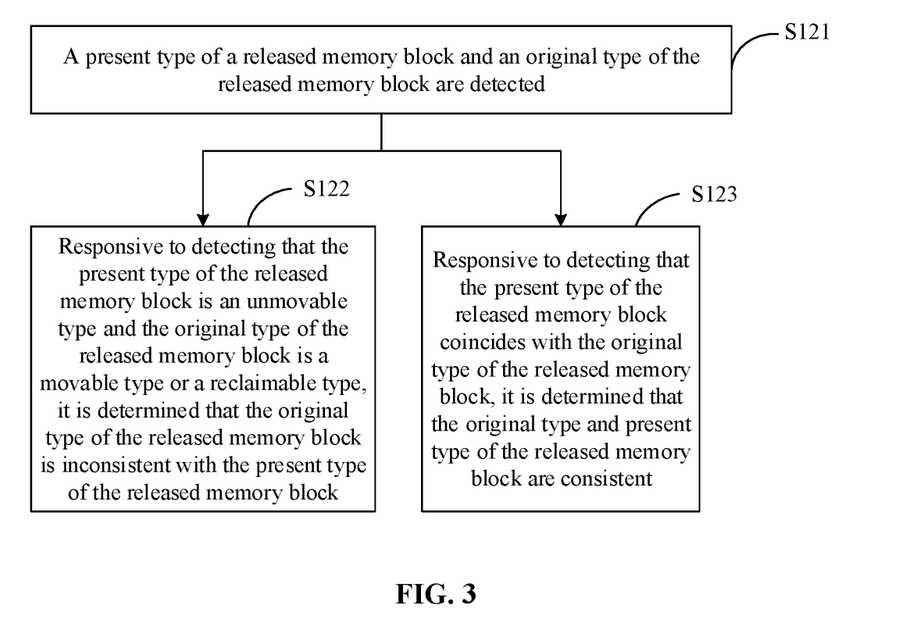
FIG. 3 is a flowchart of substeps of S120 in FIG. 2 according to an embodiment of the disclosure.

Referring to FIG. 3, FIG. 3 is a flowchart of substeps of S120 in FIG. 2 according to an embodiment of the disclosure. S120 may include S121, S122 and S123.

In S121, the present type of the released memory block and an original type of the released memory block are detected.

In the embodiment of the disclosure, the present type refers to the presently detected type of the released memory block, and the present type may be a type obtained after the released memory block is borrowed and converted. The original type refers to a type that the released memory block originally belongs to during initial memory configuration, i.e., a type before the released memory block is borrowed and converted.

In S122, responsive to detecting that the present type of the released memory block is the unmovable type and the original type of the released memory block is the movable type or the reclaimable type, it is determined that the original type of the released memory block is inconsistent with the present type of the released memory block.

In the embodiment of the disclosure, if the original type of the released memory block is inconsistent with the present type of the released memory block, it is indicated that the released memory block has been borrowed and the type of the released memory block has been converted.

In S123, responsive to detecting that the present type of the released memory block coincides with the original type of the released memory block, it is determined that the original type of the released memory block is consistent with the present type of the released memory block.

In the embodiment of the disclosure, if the original type of the released memory block is consistent with the present type of the released memory block, it is indicated that the released memory block is not borrowed and the type is not converted.

Referring to FIG. 2 again, the method further includes S130.

In S130, responsive to detecting that the original type of the released memory block is inconsistent with the present type of the released memory block, a released memory capacity of the released memory block is detected.

Figure 4:
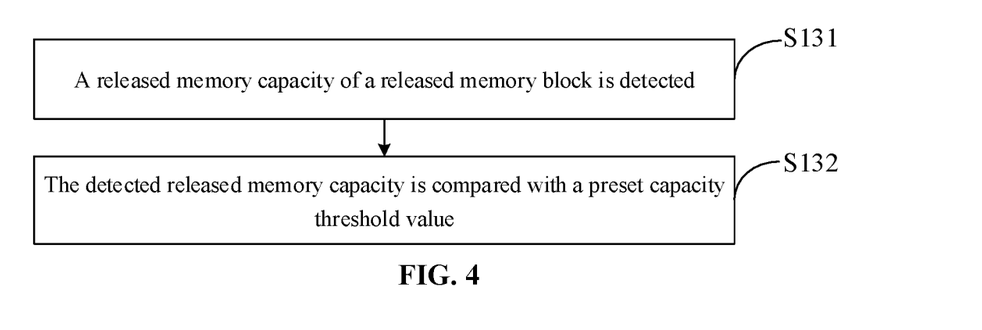
FIG. 4 is a flowchart of substeps of S130 in FIG. 2 according to an embodiment of the disclosure.

Referring to FIG. 4, FIG. 4 is a flowchart of substeps of S130 in FIG. 2 according to an embodiment of the disclosure. S120 may include S131 and S132.

In S131, the released memory capacity of the released memory block is detected.

In the embodiment of the disclosure, when the original type of the released memory block is inconsistent with the present type of the released memory block, the electronic device 100 may detect the released memory capacity of the released memory block.

In S132, the detected released memory capacity is compared with a preset capacity threshold value.

In the embodiment of the disclosure, the electronic device 100 may compare the detected released memory capacity with the preset capacity threshold value to judge whether a type switching condition is met or not and, when the type switching condition is met, namely the detected released memory capacity is not less than the preset capacity threshold value, executes S140. The preset capacity threshold value may be set according to a practical requirement. For example, the preset capacity threshold value may be set to be 64 KB.

In S140, the present type of the released memory block is adjusted according to the detected released memory capacity.

In the embodiment of the disclosure, when the detected released memory capacity is not less than the preset capacity threshold value, the present type of the released memory block is adjusted into the original type of the released memory block.

In the embodiment of the disclosure, the present type of the released memory block is adjusted into the original type of the released memory block in the following manners.

When the original type of the released memory block is the reclaimable type, the present type of the released memory block is adjusted to be reclaimable.

When the original type of the released memory block is the movable type, the present type of the released memory block is adjusted to be movable.

Therefore, the types of the memory blocks may be adjusted to prevent a capacity of a memory partition of the movable type from being reduced, ensure sufficient regional ranges of memory partitions of the reclaimable and/or movable types and, during memory compaction, effectively provide a continuous memory that is sufficient for a user to use by compaction to delay occurrence of the memory fragmentation problem next time.

Figure 5:
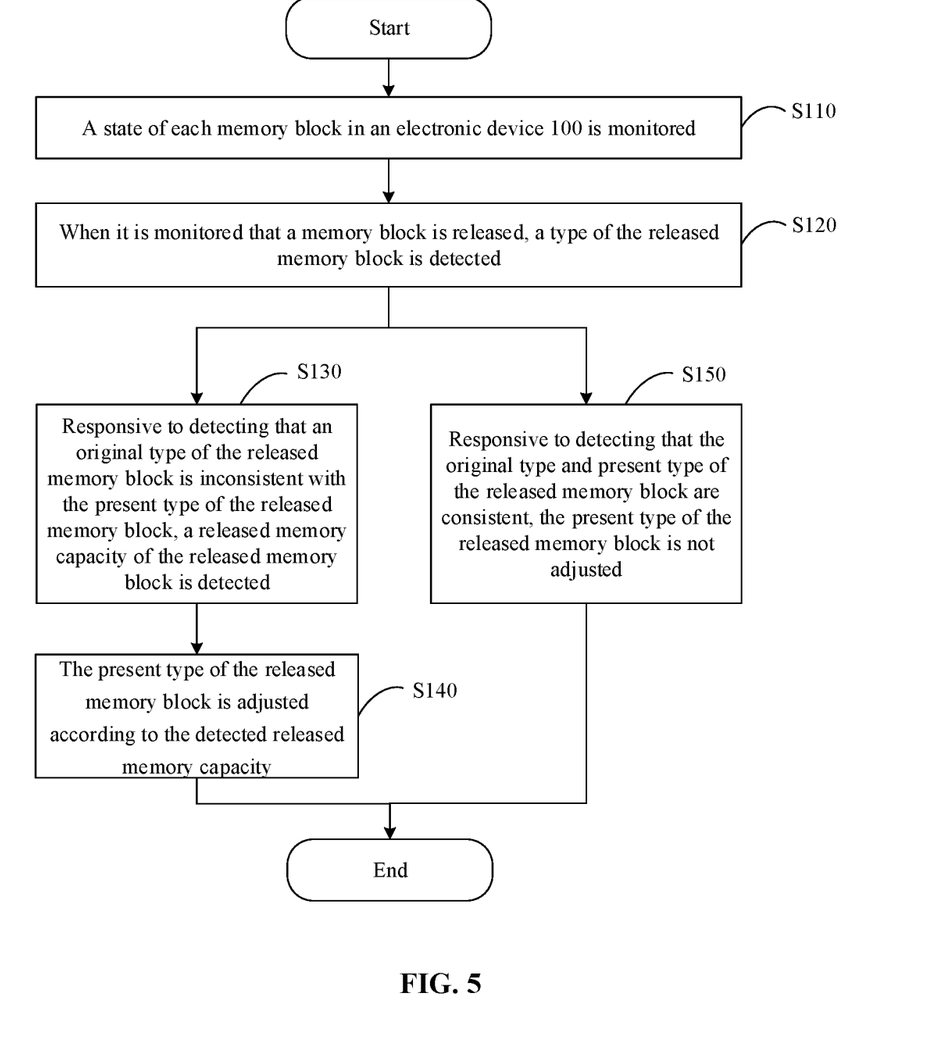
FIG. 5 is a second flowchart of steps of a memory block type processing method according to an embodiment of the disclosure.

Referring to FIG. 5, FIG. 5 is a second flowchart of steps of a memory block type processing method according to an embodiment of the disclosure. The method further includes S150.

In S150, responsive to detecting that the original type of the released memory block is consistent with the present type of the released memory block, the present type of the released memory block is not adjusted.

In the embodiment of the disclosure, if the original type of the released memory block is consistent with the present type of the released memory block, it is indicated that the released memory block is not borrowed and the type is not converted, and the electronic device 100 may directly release a resource occupied by the memory block without adjusting the present type of the released memory block.

Figure 6:
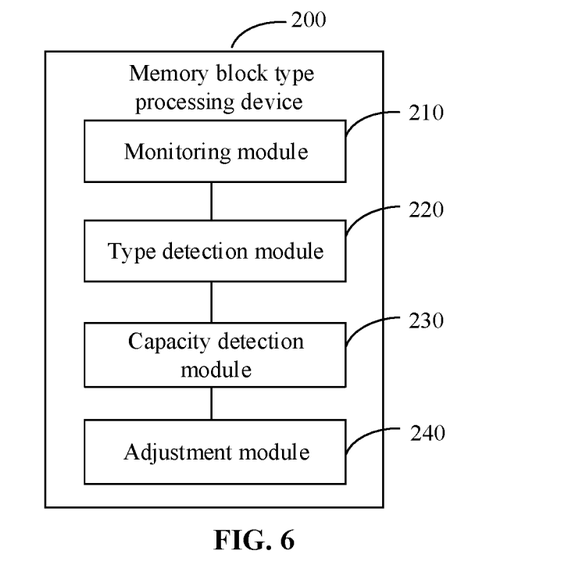
FIG. 6 is a block diagram of function modules of a memory block type processing device according to an embodiment of the disclosure.

Referring to FIG. 6, FIG. 6 is a block diagram of function modules of a memory block type processing device 200 according to an embodiment of the disclosure. The memory block type processing device 200 is applied to an electronic device 100. The device includes a monitoring module 210, a type detection module 220, a capacity detection module 230 and an adjustment module 240.

The monitoring module 210 is configured to monitor a state of each memory block in the electronic device 100.

In the embodiment of the disclosure, the monitoring module 210 is configured to execute S110 in FIG. 2, and specific descriptions about the monitoring module 210 may refer to the descriptions about S110.

The type detection module 220 is configured to, when it is monitored that a memory block is released, detect a type of the released memory block.

In the embodiment of the disclosure, the type detection module 220 is configured to execute S120 in FIG. 2, and specific descriptions about the type detection module 220 may refer to the descriptions about S120.

The capacity detection module 230 is configured to, responsive to detecting that an original type of the released memory block is inconsistent with a present type of the released memory block, detect a released memory capacity of the released memory block.

In the embodiment of the disclosure, the capacity detection module 230 is configured to execute S130 in FIG. 2, and specific descriptions about the capacity detection module 230 may refer to the descriptions about S130.

The adjustment module 240 is configured to adjust the present type of the released memory block according to the detected released memory capacity.

In the embodiment of the disclosure, the adjustment module 240 is configured to execute S140 in FIG. 2, and specific descriptions about the adjustment module 240 may refer to the descriptions about S140.

From the above, the embodiments of the disclosure provide the processing method and device for memory block type, the electronic device and the readable storage medium. The method is applied to the electronic device. The memory of the electronic device includes the multiple memory blocks of the movable type, the multiple memory blocks of the reclaimable type and the multiple memory blocks of the unmovable type. The method includes that: the state of each memory block in the electronic device is monitored; when it is monitored that a memory block is released, the type of the released memory block is detected; responsive to detecting that the original type of the released memory block is inconsistent with the present type of the released memory block, the released memory capacity of the released memory block is detected; and the present type of the released memory block is adjusted according to the detected released memory capacity. Therefore, sufficient regional ranges of memory partitions of the reclaimable and/or movable types can be ensured, and during memory compaction, a continuous memory that is sufficient for a user to use can be effectively provided by compaction to alleviate the memory fragmentation problem.

The above are only some embodiments of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

INDUSTRIAL APPLICABILITY

The embodiments of the disclosure provide the processing method and device for memory block type, the electronic device and the readable storage medium. The memory of the electronic device includes the multiple memory blocks of the movable type, the multiple memory blocks of the reclaimable type and the multiple memory blocks of the unmovable type. The method includes that: the state of each memory block in the electronic device is monitored; when it is monitored that a memory block is released, the type of the released memory block is detected; responsive to detecting that the original type of the released memory block is inconsistent with the present type of the released memory block, the released memory capacity of the released memory block is detected; and the present type of the released memory block is adjusted according to the detected released memory capacity. Therefore, sufficient regional ranges of memory partitions of the reclaimable and/or movable types can be ensured, and during memory compaction, a continuous memory that is sufficient for a user to use can be effectively provided by compaction to alleviate the memory fragmentation problem.

The invention claimed is:

1. A memory block type processing method, applied to an electronic device, a memory of the electronic device comprising a plurality of memory blocks of a movable type, a plurality of memory blocks of a reclaimable type and a plurality of memory blocks of an unmovable type, the method comprising:
monitoring a state of each memory block in the electronic device;

when it is monitored that a memory block is released, detecting a type of the released memory block;
responsive to detecting that an original type of the released memory block is inconsistent with a present type of the released memory block, detecting a released memory capacity of the released memory block; and
adjusting the present type of the released memory block according to the detected released memory capacity.

2. The method of claim 1, further comprising:
responsive to detecting that the original type of the released memory block is consistent with the present type of the released memory block, not adjusting the present type of the released memory block.

3. The method of claim 1, wherein detecting the type of the released memory block comprises:
detecting the present type of the released memory block and the original type of the released memory block;
responsive to detecting that the present type of the released memory block is the unmovable type and the original type of the released memory block is the movable type or the reclaimable type, determining that the original type of the released memory block is inconsistent with the present type of the released memory block; and
responsive to detecting that the present type of the released memory block coincides with the original type of the released memory block, determining that the original type of the released memory block is consistent with the present type of the released memory block.

4. The method of claim 3, further comprising: after detecting the released memory capacity of the released memory block,
comparing the detected released memory capacity with a preset capacity threshold value.

5. The method of claim 4, wherein adjusting the present type of the released memory block according to the detected released memory capacity comprises:
when the detected released memory capacity is not less than the preset capacity threshold value, adjusting the present type of the released memory block into the original type of the released memory block.

6. The method of claim 5, wherein adjusting the present type of the released memory block into the original type of the released memory block comprises:
when the original type of the released memory block is the reclaimable type, adjusting the present type of the released memory block into the reclaimable type; and
when the original type of the released memory block is the movable type, adjusting the present type of the released memory block into the movable type.

7. An electronic device, comprising:
a processor; and
a memory comprising a plurality of memory blocks of a movable type, a plurality of memory blocks of a reclaimable type and a plurality of memory blocks of an unmovable type, and storing one or more instructions for execution by the processor, the one or more instructions comprising:
instructions for monitoring a state of each memory block in the electronic device;
instructions for, when it is monitored that a memory block is released, detecting a type of the released memory block;
instructions for, responsive to detecting that an original type of the released memory block is inconsistent with a present type of the released memory block, detecting a released memory capacity of the released memory block; and
instructions for adjusting the present type of the released memory block according to the detected released memory capacity.

8. The electronic device of claim 7, wherein the one or more instructions further comprise:
instructions for, responsive to detecting that the original type of the released memory block is consistent with the present type of the released memory block, not adjusting the present type of the released memory block.

9. The electronic device of claim 7, wherein the instructions for detecting the type of the released memory block comprise:
instructions for detecting the present type of the released memory block and the original type of the released memory block;
instructions for, responsive to detecting that the present type of the released memory block is the unmovable type and the original type of the released memory block is the movable type or the reclaimable type, determining that the original type of the released memory block is inconsistent with the present type of the released memory block; and
instructions for, responsive to detecting that the present type of the released memory block coincides with the original type of the released memory block, determining that the original type of the released memory block is consistent with the present type of the released memory block.

10. The electronic device of claim 9, wherein the one or more instructions further comprise:
instructions for, after detecting the released memory capacity of the released memory block, comparing the detected released memory capacity with a preset capacity threshold value.

11. The electronic device of claim 10, wherein the instructions for adjusting the present type of the released memory block according to the detected released memory capacity comprise:
when the detected released memory capacity is not less than the preset capacity threshold value, adjusting the present type of the released memory block into the original type of the released memory block.

12. The electronic device of claim 11, wherein the instructions for adjusting the present type of the released memory block into the original type of the released memory block comprise:
instructions for, when the original type of the released memory block is the reclaimable type, adjusting the present type of the released memory block into the reclaimable type; and
instructions for, when the original type of the released memory block is the movable type, adjusting the present type of the released memory block into the movable type.

13. A non-transitory readable storage medium having stored thereon a computer program that, when executed, causes a processor of an electronic device where the non-transitory readable storage medium is located to implement a memory block type processing method, a memory of the electronic device comprising a plurality of memory blocks of a movable type, a plurality of memory blocks of a reclaimable type and a plurality of memory blocks of an unmovable type, the method comprising:

monitoring a state of each memory block in the electronic device;

when it is monitored that a memory block is released, detecting a type of the released memory block;

responsive to detecting that an original type of the released memory block is inconsistent with a present type of the released memory block, detecting a released memory capacity of the released memory block; and adjusting the present type of the released memory block according to the detected released memory capacity.

14. The non-transitory readable storage medium of claim 13, wherein the method further comprises:

responsive to detecting that the original type of the released memory block is consistent with the present type of the released memory block, not adjusting the present type of the released memory block.

15. The non-transitory readable storage medium of claim 13, wherein the detecting the type of the released memory block comprises:

detecting the present type of the released memory block and the original type of the released memory block;

responsive to detecting that the present type of the released memory block is the unmovable type and the original type of the released memory block is the movable type or the reclaimable type, determining that the original type of the released memory block is inconsistent with the present type of the released memory block; and responsive to detecting that the present type of the released memory block coincides with the original type of the released memory block, determining that the original type of the released memory block is consistent with the present type of the released memory block.

16. The non-transitory readable storage medium of claim 15, wherein the method further comprises: after detecting the released memory capacity of the released memory block, comparing the detected released memory capacity with a preset capacity threshold value.

17. The non-transitory readable storage medium of claim 16, wherein the adjusting the present type of the released memory block according to the detected released memory capacity comprises:

when the detected released memory capacity is not less than the preset capacity threshold value, adjusting the present type of the released memory block into the original type of the released memory block.

18. The non-transitory readable storage medium of claim 17, wherein the adjusting the present type of the released memory block into the original type of the released memory block comprises:

when the original type of the released memory block is the reclaimable type, adjusting the present type of the released memory block into the reclaimable type; and when the original type of the released memory block is the movable type, adjusting the present type of the released memory block into the movable type.

* * * * *